(12) United States Patent
Sanders et al.

(10) Patent No.: US 10,892,966 B2
(45) Date of Patent: Jan. 12, 2021

(54) MONITORING INTERCONNECT FAILURES OVER TIME

(71) Applicant: Apple Inc., Cupertino, CA (US)

(72) Inventors: Christopher J. Sanders, San Jose, CA (US); Gerald W. Katzung, Cupertino, CA (US); Gopu Bhaskar, Cupertino, CA (US); Jad Osseiran, San Francisco, CA (US); Kofi Boateng, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 203 days.

(21) Appl. No.: 15/995,819

(22) Filed: Jun. 1, 2018

(65) Prior Publication Data

US 2019/0372874 A1    Dec. 5, 2019

(51) Int. Cl.
| | | |
|---|---|---|
| *H04L 1/00* | (2006.01) | |
| *H04L 12/26* | (2006.01) | |
| *G09G 5/00* | (2006.01) | |
| *H04W 76/18* | (2018.01) | |

(52) U.S. Cl.
CPC ......... *H04L 43/0847* (2013.01); *G09G 5/006* (2013.01); *H04L 43/16* (2013.01); *H04W 76/18* (2018.02)

(58) Field of Classification Search
None
See application file for complete search history.

(56) References Cited

U.S. PATENT DOCUMENTS

| | | | | |
|---|---|---|---|---|
| 9,878,241 | B2* | 1/2018 | Perlman | A63F 13/358 |
| 2007/0300104 | A1* | 12/2007 | Thayer | G06F 13/4295 |
| | | | | 714/704 |
| 2008/0168312 | A1* | 7/2008 | Banks | H04L 1/0015 |
| | | | | 714/39 |
| 2008/0192814 | A1* | 8/2008 | Hafed | G01R 31/31711 |
| | | | | 375/224 |
| 2015/0324265 | A1* | 11/2015 | Nelson | G06F 11/263 |
| | | | | 714/43 |
| 2015/0326884 | A1* | 11/2015 | Bae | H04N 19/182 |
| | | | | 375/240.27 |
| 2015/0365703 | A1* | 12/2015 | Puri | H04N 19/176 |
| | | | | 375/240.24 |
| 2016/0234031 | A1* | 8/2016 | Rabii | H04L 12/189 |
| 2016/0234032 | A1* | 8/2016 | Rabii | H04L 43/0829 |
| 2018/0234318 | A1* | 8/2018 | Cox | H04L 43/0823 |

OTHER PUBLICATIONS

J. Gruen, M. Gorius and T. Herfet, "Interactive RTP services with predictable reliability," 2013 IEEE Third International Conference on Consumer Electronics ¿ Berlin (ICCE-Berlin), Berlin, 2013, pp. 371-375, doi: 10.1109/ICCE-Berlin.2013.6698014. (Year: 2013).*

* cited by examiner

*Primary Examiner* — Daniel F. McMahon
(74) *Attorney, Agent, or Firm* — BakerHostetler

(57) ABSTRACT

Techniques are disclosed for automated detection and notification of interconnect errors or failure. An interconnect is tested via passive or active means. Error data associated with data transferred via the interconnect is measured and analyzed to generate error statistics. Error statistics are then used to determine an error rate of the interconnect and an alert is generated if the error rate exceeds a threshold. Alerts are displayed to users for troubleshooting and/or for indication that the interconnect should be replaced.

23 Claims, 4 Drawing Sheets

100

200

300

400

600

500

700

MONITORING INTERCONNECT FAILURES OVER TIME

BACKGROUND

The present disclosure relates to techniques for automated detection and notification of interconnect errors or failure.

Although modern video display environments vary widely, many of them share several basic characteristics. A video source provides video data to a display device over a connection such as a wired cable or wireless communication link (collectively, "interconnect"). The video source and the display device each may support a variety of display formats. Various interconnect communication protocols have been developed not only to permit the devices to exchange video but also to permit the devices to exchange information about their capabilities. The High-Definition Multimedia Interface ("HDMI") protocol is an example of one such protocol.

Problems with the presentation of media may be caused by any number of problems with the media source or media display. Compounding the problem, the media source and display may function correctly, but the interconnect between them may malfunction. Because of this, it may be difficult to determine the origin of a presentation problem. Additionally, error analysis may be based on prompting a user to indicate manually whether there are presentation errors.

DETAILED DESCRIPTION

Aspects of the present disclosure provide techniques for testing functionality of an interconnect. When an interconnect is ineffective or faulty, media may not properly transfer from a media source to a media display device, resulting in errors during presentation. An interconnect may be tested passively via monitoring while the interconnect carries run time data or actively via stress testing with test data. Testing may be performed automatically without requiring user input regarding presentation errors. Testing may discover and generate data errors associated with data transferred via the interconnect. The data errors may then be measured and analyzed to generate error statistics associated with the interconnect. If the statistics indicate a high enough error rate, an alert may be generated and displayed to a user, who may then troubleshoot or replace the interconnect.

Figure 1:
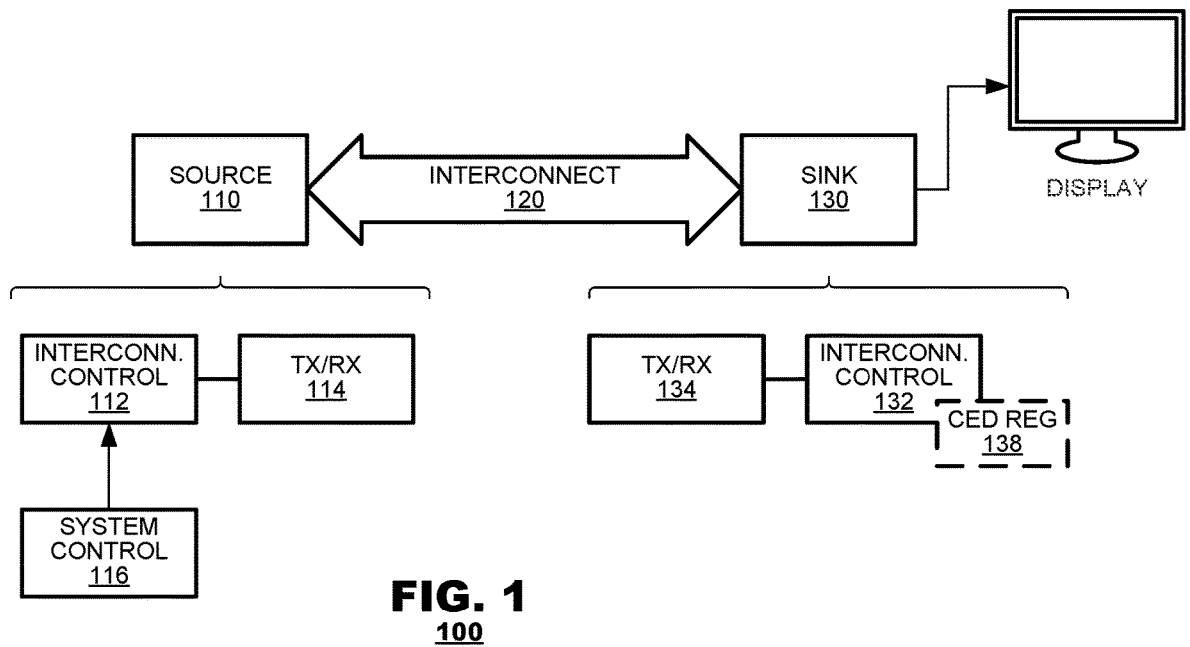
FIG. 1 is a functional block diagram of a media delivery system according to an aspect of the present disclosures.

FIG. 1 is a functional block diagram of a media delivery system 100 according to an aspect of the present disclosures. The system 100 may include a media source device ("source") 110 and a media sink device ("sink") 130 connected by an interconnect 120. The source 110 may provide media data, typically an audio/video stream, to the sink device 130. The source 110 and the sink 130 may engage in mutual communication via the interconnect 120. The source and sink 110, 130 typically communicate over the interconnect 120 according to a predefined communication protocol.

As indicated, the source 110 may source media data to the sink 130. The source 110 may include a transmitter/receiver ("TX/RX," for convenience) 114, an interconnect controller 112, and a system controller 116. The TX/RX 114 may transmit and receive data via the interconnect 120 in a manner that conforms to the communication protocol. The interconnect controller 112 may manage the source device's participation in a communication session that is established between the source 110 and the sink 130. For example, the interconnect controller 112 may issue commands to the TX/RX 114 that cause it to initiate a communication session with the sink 130, to transmit control signals that govern operation of the session, and ultimately, to terminate the communication session with the sink 130. The system controller 116 may manage overall operation of the source device 110. For example, the system controller 116 may field user commands (not shown) that cause the source device 110 to initiate a communication session with the sink device 130 and to deliver video to the sink. The system controller 116 may initiate commands that cause the interconnect controller 112 to initiate and terminate communication sessions, respectively.

In practice, the functionality of the source device 110 may be integrated into any number of commercially-available consumer electronic devices that source video data to displays. For example, the source device 110 may be provisioned as a functional system within a set top box, a media player, a satellite receiver, a computer, a video game system or like system that deliver audio/video data to a display. The type of source device is immaterial to the present discussion unless identified hereinbelow.

As indicated, the sink 130 may receive media data from a source device and render it. For example, the sink 130 include output components, such as a display device, an audio device, or any combination thereof. The sink 130 may include a transmitter/receiver (also "TX/RX") 134, and an interconnect controller 132. The TX/RX 134 may transmit and receive data in a manner that conforms to the communication protocol of the interconnect 120. The interconnect controller 132 may manage the source device's participation in a communication session that is established between the source 110 and the sink 130. For example, the interconnect controller 132 issue commands to the TX/RX 134 that cause it to initiate a communication session with the source 110, to transmit control signals that govern operation of the session, and ultimately, to terminate the communication session with the source 110.

The interconnect 120 may be any suitable means of transmitting data from the source 110 to the sink 130, such as a wire conduit or a wireless antenna system. In example aspects, the interconnect 120 may take the form of wired connection, such as an HDMI cable. The interconnect 120 may also be provided by a wireless connection instead, for example a wireless HDMI communication link. In either case, the TX/RX 114 may communicate with the sink 130 over the interconnect 120 by a governing communication protocol.

As described, aspects of the present disclosure provide techniques to test functionality of an interconnect 120 between a source 110 and sink device 130. In one aspect, a sink device 130 may log error events that are observed in communications received over the interconnect 120 and may report data representing such error events to the source 110 upon request.

In an aspect, the system controller 116 may gather error data from passive testing of the interconnect 120. A passive test may occur during normal runtime operation of the source 110 and the sink 130, such as when the source 110 delivers video to the sink 130 during ordinary operation of the system (e.g., a user is watching video on the sink 130).

One such passive test may occur through error detection processes performed by the sink device 130. For example, a TX/RX 134 at the sink 130 may perform character error detection (CED) on an HDMI interconnect and generate data from the CED process that indicates detected errors. The sink 130 may include an error register 138 that stores data representing errors identified during data reception. In such an aspect, the register 138 may store data representing a count of character errors detected within a temporal interval (such as a time since the register 138 was last cleared) or representing a rate of errors detected within a predetermined period of time (e.g., errors per second). For other types of interconnects, the error data may be derived from bit error rates, symbol error rates or other indicia of communication errors. When errors are detected during runtime operation, the sink 130 may update error values stored in the register 138.

The source 110 may request error data from the sink 130 over the interconnect 120. In particular, a controller 116 within the source 110 (perhaps the controller 112) may initiate a process through which the TX/RX 114 issues a request over the interconnect 120 that queries the sink 130 for its stored error data. The sink 130 may respond by retrieving a stored error value from its register 138 and providing it to the source 110, again, via the interconnect 120. The system controller 116 may process the reported error data to determine if it indicates proper operation or abnormal operation of the interconnect 120.

Passive testing alternatively can be performed by the sink 110 itself. In an embodiment, the source 110 may monitor requests received from a sink 130 to re-establish communication. For example, for an HDMI interconnect, the source 110 may monitor a number of re-authentication events that occur on the HDMI interconnect over time. Re-authentication request data may be generated during normal runtime operations when the sink 130 requests re-authentication of the source 110. For example, the sink 130 may temporarily lose connection with the source 110 and request the source 110 re-authenticate itself before receiving additional data from the source 110. Each re-authentication request may be logged for later analysis.

In an aspect, the source 110 may gather error data on an active basis from stress testing the interconnect 120. The source 110 may activate a test mode and perform one or more stress tests on the interconnect 120 by driving data to the sink 130 over the interconnect 120. During stress testing, the system 100 may not be suitable for normal runtime operation, such as displaying video content to a user. A stress test may be used to find the limits of a connection over the interconnect 120. A stress test may send data over the interconnect 120 at data rates that approximate the maximum data rate of a video protocol supported by the sink 130 or a maximum data rate supported by the interconnect 120. For example, the source 110 may drive a first type of data supported by the communication protocol to the sink 130 at varying data rates and estimate errors at each data rate. The source 110 may continue increasing the data rate until the limit of the communication protocol is reached. The source 110 may repeat such an increasing-data-rate test for each type of data supported by the communication protocol. The system source 110 may also vary the size of data driven to the sink 130 until a maximum size supported by the communication protocol of the interconnect 120 is reached. For example, the system controller 116 may drive packets of data at increasing sizes and gather errors at each size for each speed. Error data from stress testing may be gathered by the source 110 and/or the sink 130 in a manner similar to that performed from passive testing. For example, a number of CED errors may be gathered by the sink 130 and retrieved by the source 110. In another example, a number of re-authentication errors may be tallied by the source 110.

In an aspect, the source 110 may analyze error data to generate error statistics associated with the interconnect 120. Error data may have been generated via passive means, active testing means, or both. Based on the error statistics, the source 110 may determine an error rate of the interconnect 120 and generate an alert when the error rate is higher than an alert threshold. Such an alert may indicate a problem with the interconnect 120. The alert threshold may be tailored according to, for example, a user, a device manufacturer, and a system administrator. The source 110 may generate the alert, for example, as video data that is transmitted to the sink 130 via the interconnect 120 for display to a user. Alternatively, the alert may be transmitted to another user interface, such as that associated with a computer application or other interface associated with the system 100. For example, in a case where the interconnect 120 is an HDMI cable, an alert may provide a recommendation the HDMI cable should be replaced. The source 110 may include with the alert an interactive guide that guides a user through diagnostic and/or corrective plan(s) to attempt to fix the interconnect 120.

The techniques proposed herein may be applied with a variety of media sources, including, for example, digital media players (such as the Apple TV player system), set top boxes, gaming consoles, computers, video capture devices, and other types of display controllers. Similarly, the proposed techniques may be applied to a variety of display devices such as LCD- and/or LED-based displays, video projectors, and the like. The types of video sources and types of display devices are immaterial to the present discussion unless described herein.

Figure 2:
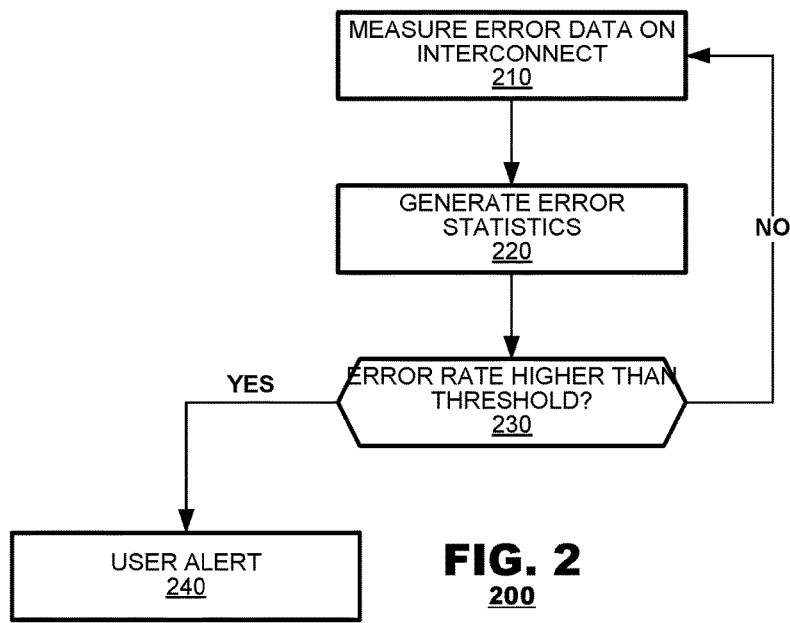
FIG. 2 illustrates a method according to an aspect of the present disclosures.

FIG. 2 illustrates a method 200 according to an aspect of the present disclosure. The method 200 may begin by measuring error data on an interconnect between a source and a sink (block 210). The method 200 may continue by generating error statistics based on the error data (block 220). The source may generate statistics based on the error data that may be beneficial in determining errors associated with the interconnect. Based on the statistics, the method 200 may determine whether an error rate of the interconnect is higher than a threshold error rate (block 230). If so, the method 200 may generate an alert (block 240). The method 200 may be repeated ad infinitum. In aspects, the method 200 may be performed on a periodic basis, such as daily, weekly, monthly, etc.

In an aspect, error data may be measured by requesting error data from the sink. The sink may gather error data during normal runtime operations, as described above. The sink may also gather error data as data is driven to it during stress testing, as described above. Error data may also be measured by gathering error data generated by the source. The source, similarly to the sink, may generate error data during normal runtime operations. The source may also generate error data during stress testing. It should be appreciated that error data gathered by the sink will likely be of a different type than that gathered by the source. For example, the sink may generate and gather CED errors, while the source may generate and gather re-authentication errors.

In an aspect, error data may be measured by an apparatus observing displayed media, such as on a display of a media sink. Such an apparatus may comprise a camera, a microphone, or both. The apparatus may be part of a system or used by a user to relay data to a system capable of performing described methods. A camera may observe presented media and determine if there are errors during presentation. Such error data may then be analyzed in accordance with described aspects. A microphone may similarly be used to observe errors in audio during media presentation. Error data observed by an apparatus may be used in lieu of prompting a user to indicate whether errors are present. Such an apparatus may be more effective at determining errors that may not be readily apparent to a user, such as inconsistent or lower framerates, missed frames, missing or incorrect audio, etc. Error detection via use of an apparatus may occur automatically or upon user prompt.

In an aspect, error statistics may be determined from the error data. Error statistics may include statistics useful for diagnosing a problem with the interconnect, such as a total number of errors, a total number of specific types of errors, and error rates associated with the number of errors. An error rate may comprise a number of errors over an amount of time. Error rates may be calculated for the total number of errors over a given time period, the total number of specific types of errors over a given time period, or both. For example, an error rate may comprise a number of CED errors and/or a number of re-authentication requests over a week of time. Error statistics may also include additional information regarding the errors, such as a data type, a data rate, a data size, or other attributes of the data that caused the error. Such additional information may be useful for diagnosing problems with the interconnect, such as data types, data rates, and data sizes that may be incompatible with the interconnect. Parameters such as which error statistics to calculate and the amount of time used to determine error rates may be preconfigured by the source, the sink, and/or the interconnect. Such parameters may also be configured by a system administrator or a user. For example, different error statistics may be more beneficial for different protocols, e.g., re-authentication error statistics may be important for use with the HDMI protocol, but not important for other communication protocols.

In an aspect, one or more error rates of the interconnect may be determined from the error statistics and compared to one or more threshold error rates. Threshold error rates may be preconfigured by the source, the sink, and/or the interconnect. Such parameters may also be configured by a system administrator or a user. For example, some protocols may have higher threshold error rates than other protocols. If one or more of the error rates exceeds a threshold error rate, an alert may be generated.

In an aspect, a generated alert may be sent to the sink via the interconnect. The alert may be displayed to the user by a display connected to the sink. The alert may also be sent to another user interface, such as that associated with a computer application or other interface. The alert may indicate the error rate of the interconnect and/or other error statistics of the interconnect. Alternatively or additionally, the alert may walk the user through troubleshooting steps associated with the interconnect. Example troubleshooting steps may include disconnecting the interconnect from the source and/or the sink, reconnecting the interconnect to the source and/or the sink, disconnecting or reconnecting the interconnect from the source and sink in a specific order, replacing the interconnect, rebooting the source and/or the sink, or any combination thereof.

Figure 3:
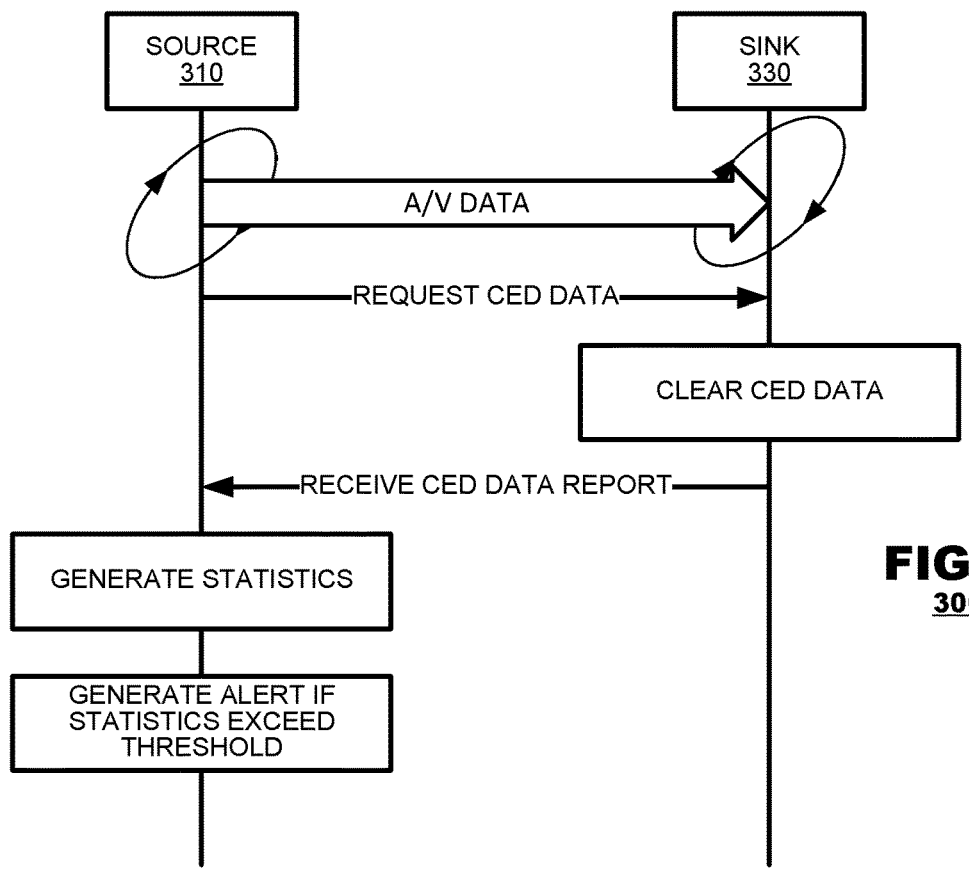
FIG. 3 illustrates a sequence diagram according to an aspect of the present disclosures.

FIG. 3 illustrates a sequence diagram of a lifecycle of interconnect error detection methods according to aspects of the present disclosures. Specifically, FIG. 3 illustrates an aspect for error detection with respect to CED data.

Character error detection (CED) data may be generated by a sink receiving media over connection using a character-based protocol, such as an HDMI connection. For example, the HDMI protocol may break data into symbols, which may comprise bit codes, e.g., HDMI may use 10-bit codes to represent symbols. Each symbol may represent a character. When a character is detected by the sink to be incorrect, corrupted, or missing, a CED error may be logged. A CED error may also be detected and/or logged differently based on the protocol being used for transmission. For example, a communication protocol may perform many retransmissions of data, and repeated characters may not be considered errors. Additionally, CED errors do not need to natively be part of the communication protocol used by the interconnect. CED errors may be logged and generated solely by the sink for later analysis. For example, CED errors may not normally appear in an HDMI protocol, but the sink may generate them for error analysis of the interconnect, as described herein.

FIG. 3 shows audio/video (A/V) data being continually sent from a source 310 to a sink 330 via an interconnect. The sink 330 may generate and store CED data regarding errors in transmission. CED data storage may be performed by any suitable means, including a CED register, as described above with respect to FIG. 1. The source 310 may request such CED data from the sink 330. The sink 330 may receive the request and send the CED data to the source 310. The sink 330 may also clear its CED data. Clearing CED data allows the sink 330 to save storage space and allows the source 310 to determine more easily a number of CED data errors that have occurred since the last CED error data analysis. The source 310 may receive the CED data from the sink 330 and perform an analysis on the CED data, such as that described with respect to the method 200 of FIG. 2. The source 310 may generate statistics based on the CED data and generate an alert if the statistics exceed a threshold. Large amounts of CED data or a high error rate may indicate that the interconnect needs servicing or replacement. If an error rate exceeds a configured alert threshold, the source 310 may generate an alert. The generated alert may be transmitted to the sink 330 or other user interface for presentation to a user, as described above.

Figure 4:
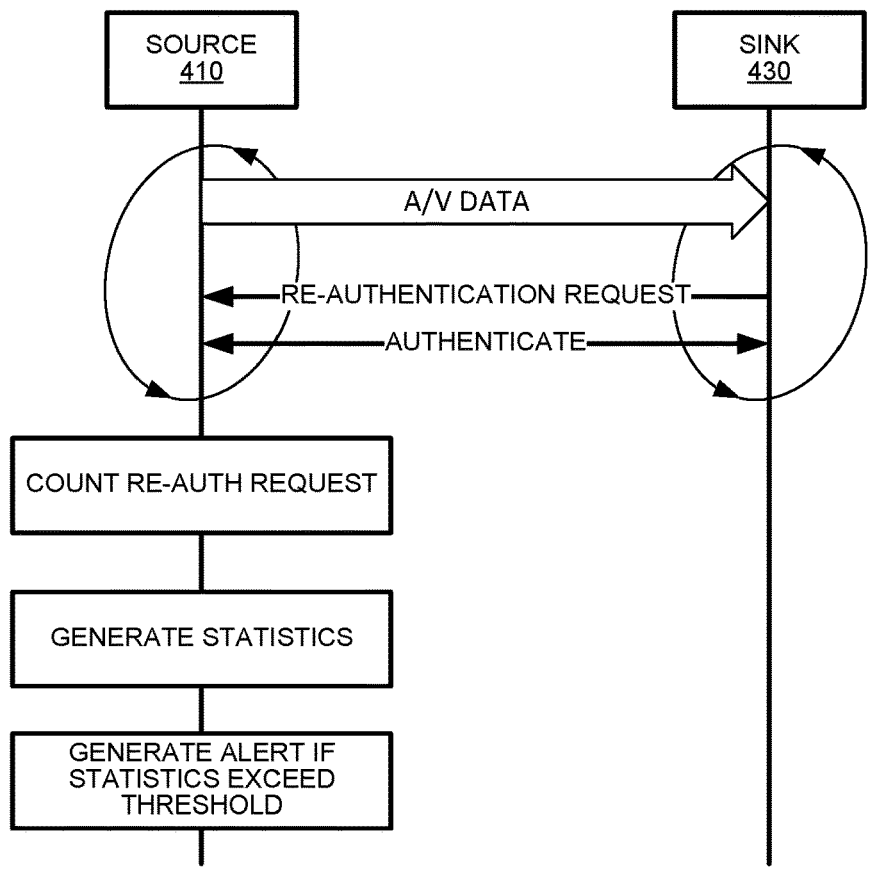
FIG. 4 illustrates a sequence diagram according to an aspect of the present disclosures.

FIG. 4 illustrates a sequence diagram of a lifecycle of interconnect error detection methods according to aspects of the present disclosures. Specifically, FIG. 4 illustrates an aspect for error detection with respect to re-authentication data.

FIG. 4 shows A/V data being continually sent from a source 410 to a sink 430 via an interconnect. Before transmission begins (not shown), the sink 430 may authenticate the source 410 via the interconnect. For example, if the A/V is transmitted using the HDMI protocol, authentication may be performed as part of the protocol before transmission begins. During transmission, the source 410 may receive a re-authentication request from the sink 430. Such a request may be generated normally after periods of use. However, such a request may also be generated if connection between the source 410 and the sink 430 via the interconnect is severed. The source 410 may store data regarding such re-authentication requests. Such data may comprise a number of re-authentication requests, a time of each re-authentication request, and other data useful for analysis. Data may be stored by the source 410 by any suitable means, including via a register similar to that used for CED data storage by the sink 130 of FIG. 1. The source 410 may perform an analysis on the re-authentication data, in a similar manner to that described with respect to the error data of the method 200 of FIG. 2. The source 410 may generate statistics based on the re-authentication data and generate an alert if the statistics exceed a threshold. Large number of re-authentication requests outside normal periods of re-authentication may indicate that the interconnect needs servicing or replacement. If a re-authentication rate exceeds a configured alert threshold, the source 410 may generate an alert and transmit the alert to the sink 430 or other user interface for presentation to a user, as described above.

Figure 5:
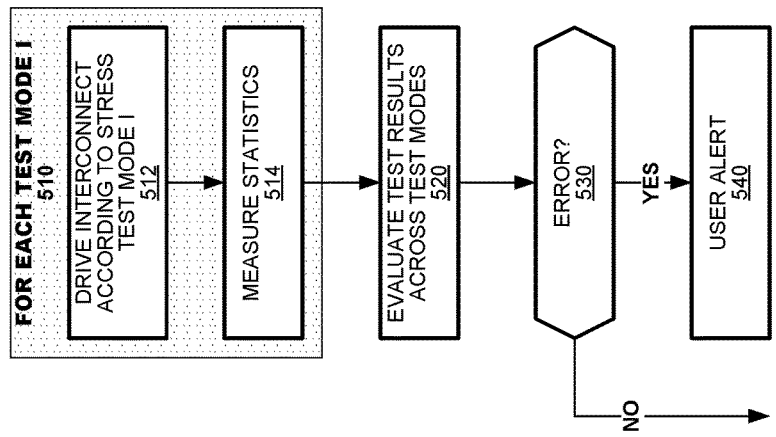
FIG. 5 illustrates a method according to an aspect of the present disclosures.

FIG. 5 illustrates a method 500 for active error evaluation of an interconnect according to an aspect of the present disclosure. The method 500 may stress test an interconnect between a source and a sink via one or more test modes (block 510). As described above, the system may be put into an active testing state. The one or more test modes may be run while the system is in the active testing state. While the system is in the active testing state, the system may not be used for normal operations such as watching television.

A test mode i may comprise the following steps. The method 500 may drive the interconnect according to the current stress test mode i (block 512). As described above, a stress test may be configured to drive one or more types and one or more sizes of data supported by a communication protocol of the interconnect at varying data rates. For example, the method 500 may drive a first type of data supported by the communication protocol over the interconnect at increasing data rates and gather errors at each data rate. The method 500 may continue increasing the data rate until the limit of the communication protocol is reached. The method 500 may repeat such an increasing-data-rate test for each type of data supported by the communication protocol. The method 500 may also vary the size of data driven over the interconnect until a maximum size supported by the communication protocol of the interconnect is reached. For example, the method 500 may drive packets of data at increasing sizes and gather errors at each size for each speed. The type and duration of a stress test may vary depending on the communication protocol used by the interconnect and also may vary depending on what characteristics of the interconnect the method 500 is configured to test. Such configuration may be inherent in the communication protocol or configured by system components, such as the source or sink, or configured by a user, such as a system administrator. The method 500 may gather error data during each stress test. Error data from stress testing may be gathered in a manner similar to that performed from periodic passive testing. For example, a number of CED errors may be gathered by the sink and retrieved by the source. In another example, a number of re-authentication errors may be tallied by the source. The method 500 may measure error data statistics regarding the current stress test i (block 514). Error statistics may be measured as described above with respect to FIG. 2. For example, measuring error data statistics may include generating a number of errors and/or an error rate over a configured amount of time. Such data may be generated by the source and/or requested from the sink prior to analysis. Data may also be stored for later analysis.

The method 500 may evaluate test results across the run stress test modes (block 520). Evaluation may include evaluation techniques for a single test mode, as described above with respect to FIG. 2, and may further include comparing error data across the one or more test modes. For example, an error rate of a first test mode may be compared to an error rate of a second test mode. Based on the evaluation, the method 500 may determine whether an error rate of the interconnect is higher than a threshold error rate (block 530). Such an error rate may be a composite error rate across the one or more test modes. For example, the method 500 may combine error rates from one or more of the test modes to determine a total number of errors over the testing period. An error rate may also comprise a total number of errors found during one or more of the tests. If the error rate exceeds the threshold error rate, the method 500 may generate an alert regarding the interconnect (block 540). The alert may be displayed to the user and may be used to aid the user in troubleshooting, as described above.

The method 500 may be repeated ad infinitum to stress test the interconnect. In aspects, the method 500 may be run on a periodic basis, such as daily, weekly, monthly, etc.

Figure 6:
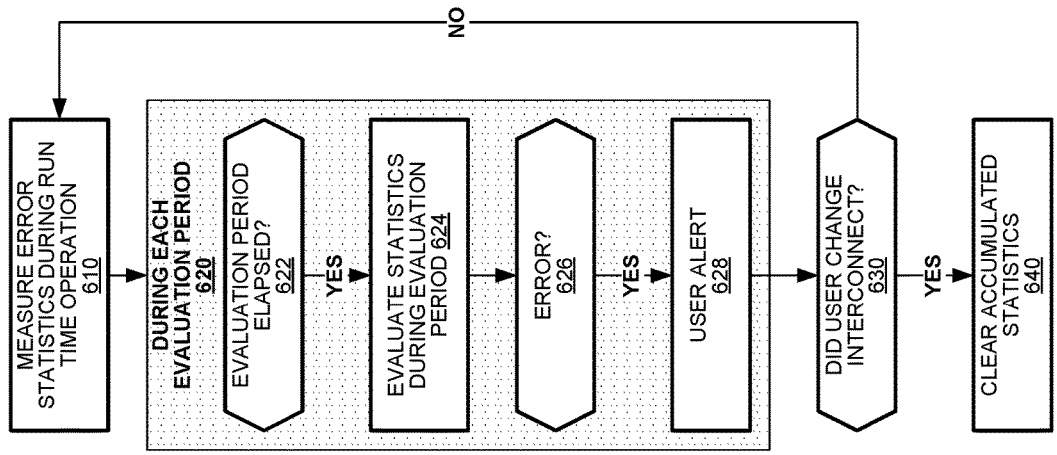
FIG. 6 illustrates a method according to an aspect of the present disclosures.

FIG. 6 illustrates a method 600 for periodic error evaluation of an interconnect according to an aspect of the present disclosure. The method 600 may monitor an interconnect between a source and a sink by measuring error statistics of the interconnect during runtime operations (block 610). Measuring error statistics may be performed as described above with respect to FIG. 2. For example, the source may measure CED error data, re-authentication error data, or other type of error data associated with the transfer of data via the interconnect. The error statistics may be updated during run time and stored at the source for later analysis. Error statistics may also be stored at the sink or other storage location for later analysis. The source may continually poll the sink for error data or statistics. The method 600 may be configured to periodically evaluate the interconnect for errors (block 620). The evaluation period may be configured to be any rolling window of time, including daily, weekly, monthly, etc.

The method 600 may perform the following during each evaluation period. The method 600 may determine if the evaluation period has elapsed since the last error evaluation of the interconnect (block 622). If the evaluation period has elapsed, the method 600 may evaluate the statistics gathered during run time operations (block 624). The method 600 may then determine whether an error rate of the interconnect is higher than a threshold error rate (block 626). If so, the method 600 may generate an alert regarding the interconnect (block 628). In an aspect, the alert may be displayed to a user via a display or other user interface, as described above. Otherwise, the method 600 acts as if the evaluation period has not elapsed and may determine whether a user changed or replaced the interconnect (block 630). If the method 600 determines the interconnect was changed, the method 600 may clear accumulated error data and statistics because those error statistics are associated with the previous interconnect (block 640). Otherwise, the method 600 may continue by measuring error statistics of the interconnect during runtime operations until the next evaluation period (block 610).

In an aspect, changing the interconnect may comprise performing one or more of the example troubleshooting steps disclosed above, such as disconnecting the interconnect, reconnecting the interconnect, and replacing the interconnect, or any combination thereof. Determining the interconnect was changed may be protocol and/or component dependent. For example, disconnection of the interconnect may be determined via hot plug detection (HPD). The method 600 may also use a timeout or other method of determining an interconnect has been disconnected.

Figure 7:
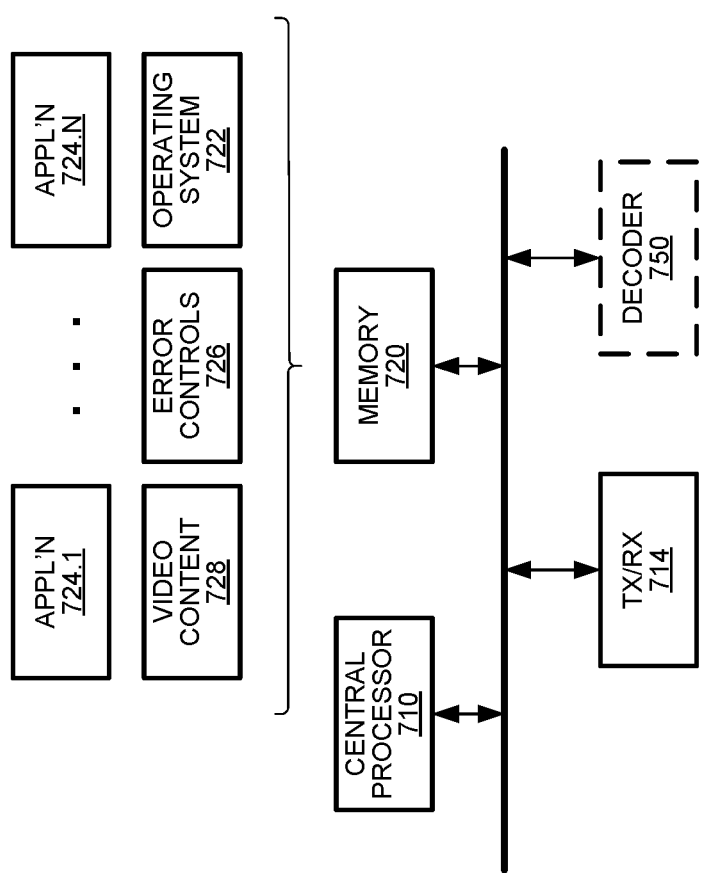
FIG. 7 is a block diagram of an exemplary video source according to an aspect of the present disclosures.

FIG. 7 is a block diagram of an exemplary video source 700 according to an aspect of the present disclosure. The video source 700 may include a central processor 710, a memory 720, and a TX/RX 714 provided in communication with one another.

The central processor 710 may read and execute various program instructions stored in the memory 720 that define an operating system 722 of the video source 700 and various applications 724.1-724.N. The program instructions may cause the central processor 710 to perform the methods described hereinabove to provide error detection and generate alerts (collectively "error control") and to drive video to the display device. Once such errors are detected, error data may be stored in the memory. The memory 720 may store the program instructions 722, 724.1-724.N and error control 726 on electrical-, magnetic- and/or optically-based storage media.

The TX/RX 730 represents a processing system that governs communication with the display device (not shown) over the interconnect. The TX/RX 730 may generate signals on the interconnect that conform to governing protocol(s) on which the interconnect operates.

The video source 700 also may possess a network transceiver (not shown) that interfaces the video source 700 to other network devices via a network connection. Such a network transceiver may generate signals on the network that conform to governing protocol(s) on which the network operates.

The video source 700 may download video to be displayed from various sources (not shown), for example, on the Internet. The video source 700 also may include video decoder(s) 750 that apply video decompression operations to received video before providing the video to the display.

Several aspects of the present disclosure are specifically illustrated and described herein. However, it will be appreciated that modifications and variations of the present disclosure are covered by the above teachings and within the purview of the appended claims without departing from the spirit and intended scope of the disclosure.

We claim:

1. A method for testing an interconnect between a media source and a media sink comprising, at the media source:
   obtaining error data associated with data transferred from the media source to the media sink over the interconnect;
   analyzing the error data to generate error statistics associated with the interconnect;
   determining an error rate of the interconnect based on the error statistics;
   generating an alert when the error rate is higher than an alert threshold; and
   transmitting the alert from the media source to the media sink over the interconnect.

2. The method of claim 1, wherein the error rate is a number of errors over time.

3. The method of claim 2, wherein the error rate is determined over a rolling window of time.

4. The method of claim 1, further comprising receiving data representing the error rate from the media sink to the media source.

5. The method of claim 1, wherein the error data are character error detection (CED) data read from the media sink by the media source over the interconnect.

6. The method of claim 1, wherein the error data are derived from re-authentication requests received from the media sink over the interconnect.

7. The method of claim 1, further comprising presenting the alert on a display of the media sink.

8. The method of claim 7, wherein the alert is presented via a user guide.

9. The method of claim 7, wherein the alert includes a message recommending replacement of the interconnect.

10. The method of claim 9, wherein the obtaining, analyzing, determining, generating and transmitting are performed in at most two iterations each performed a week apart.

11. The method of claim 1, wherein the obtaining is performed during a passive test event in which user-selected video is transferred from the media source to the media sink over the interconnect and displayed by the media sink.

12. The method of claim 1, wherein a measuring of the error data is performed during a stress test event in which the media source transfers a predetermined type or packet size of data to the media sink over the interconnect at a variety of data rates and determines error rates at each such data rate.

13. A system of a media source for testing an interconnect between the media source and a media sink comprising:
   a transmitter to transmit data to the media sink via the interconnect;
   a receiver to receive error data from the media sink; and
   a controller in which, responsive to receiving error data representing errors detected from the interconnect, the controller:
      determines an error rate of the interconnect based on the error data;
      generates an alert message when the error rate is higher than an alert threshold; and
      transmits the alert message over the interconnect.

14. The system of claim 13, wherein the error rate is a number of errors over time.

15. The system of claim 13, wherein the error data is received over the interconnect from the media sink via the receiver.

16. The system of claim 13, wherein the error data are character error detection (CED) data.

17. The system of claim 13, wherein the error data represent data associated with re-authentication requests received from the media sink.

18. The system of claim 13, wherein the alert is presented via a user guide.

19. The system of claim 13, wherein the alert includes a message recommending replacement of the interconnect.

20. The system of claim 13, wherein the error data is measured during a passive test event in which user-selected video is transferred from the media source to the media sink over the interconnect and displayed by the media sink.

21. The system of claim 13, wherein the error data is measured during a stress test event in which the media source transfers a predetermined type or packet size of data to the media sink over the interconnect at a variety of data rates and determines error rates at each such data rate.

22. The system of claim 13, wherein the controller performs the determination of the error rate, the generation, and the transmission of the alert message in at most two iterations.

23. A non-transitory computer readable medium storing program instructions that, when executed, cause a processing device of a media source to test an interconnect between the media source and a media sink by:

obtaining error data associated with data transferred from the media source to the media sink over the interconnect;

analyzing the error data to generate error statistics associated with the interconnect;

determining an error rate of the interconnect based on the error statistics;

generating an alert when the error rate is higher than an alert threshold; and transmitting the alert from the media source to the media sink over the interconnect.

* * * * *